United States Patent
Scherer

(10) Patent No.: US 6,269,599 B1
(45) Date of Patent: Aug. 7, 2001

(54) CONSTRUCTION COMPONENT OR CONSTRUCTION WITH A COMPOSITE STRUCTURE, ASSOCIATED COMPOSITE CONSTRUCTION ELEMENT, AND METHOD OF PRODUCTION

(76) Inventor: Josef Scherer, Alte Kantonsstrasse 16, Brunen CH-6440 (CH)

( * ) Notice: Subject to any disclaimer, the term of this patent is extended or adjusted under 35 U.S.C. 154(b) by 0 days.

(21) Appl. No.: 09/077,317

(22) PCT Filed: Nov. 3, 1996

(86) PCT No.: PCT/EP96/04770

§ 371 Date: Aug. 31, 1998

§ 102(e) Date: Aug. 31, 1998

(87) PCT Pub. No.: WO97/21009

PCT Pub. Date: Jun. 12, 1997

(30) Foreign Application Priority Data

Dec. 5, 1995 (CH) .................................................. 3598/95
Jun. 17, 1996 (CH) .................................................. 1673/96

(51) Int. Cl.$^7$ ...................................................... E04C 5/08
(52) U.S. Cl. .................. 52/223.6; 52/223.13; 52/223.14; 52/DIG. 7; 156/71; 156/161; 428/299.1; 428/299.4; 428/299.7
(58) Field of Search ............................... 52/223.1, 223.6, 52/223.14, 649.1, 740.1, DIG. 7; 156/71, 161, 178, 181; 428/299.1, 299.4, 299.7

(56) References Cited

U.S. PATENT DOCUMENTS

| | | | |
|---|---|---|---|
| 2,425,883 | * | 8/1947 | Jackson ......................... 52/DIG. 7 X |
| 2,921,463 | * | 1/1960 | Goldfein ............................ 52/223.13 |
| 3,466,219 | * | 9/1969 | Schwartz ........................... 156/181 X |
| 3,756,905 | * | 9/1973 | Mills et al. .................... 428/299.7 X |
| 3,859,780 | * | 1/1975 | Brown ............................ 52/223.14 X |
| 3,895,162 | * | 7/1975 | Lemont et al. ................... 156/181 X |
| 4,265,981 | * | 5/1981 | Campbell .......................... 156/181 X |
| 4,770,915 | * | 9/1988 | Nakagawa et al. ........... 428/299.7 X |
| 5,308,430 | | 5/1994 | Saito et al. . |
| 5,326,630 | | 7/1994 | Saito et al. . |
| 5,573,852 | * | 11/1996 | Thal ................................ 52/223.1 X |
| 5,617,685 | * | 4/1997 | Meier et al. ................... 52/223.14 X |
| 5,747,151 | * | 5/1998 | Tingley ............................. 428/299.1 |

FOREIGN PATENT DOCUMENTS

| | | |
|---|---|---|
| 1234703 | 4/1988 | (CA) . |
| 0155520 | 9/1985 | (EP) . |
| 0220649 | 5/1987 | (EP) . |
| 0441519 | 8/1991 | (EP) . |

* cited by examiner

Primary Examiner—Carl D. Friedman
Assistant Examiner—Kevin D. Wilkens
(74) Attorney, Agent, or Firm—Greenblum & Bernstein, P.L.C.

(57) ABSTRACT

A composite reinforcing structure for reinforcing a structural member, a method of making the structure, and a method of using the structure to reinforce a structural member. The structure includes a plurality of first fiber components arranged substantially parallel to one another and surrounded by a binder matrix, at least two of the plurality of first fiber components comprising first fiber bundles, a plurality of second fiber components arranged substantially parallel to one another and surrounded by the binder matrix, at least two of the plurality of second fiber components comprising second fiber bundles, each of the first fiber bundles comprising a plurality of individual bearing fibers arranged substantially parallel to one another, the plurality of individual bearing fibers comprising a first tensile elasticity moduli, each of the second fiber bundles comprising a plurality of individual bearing fibers arranged substantially parallel to one another, the plurality of individual bearing fibers comprising a second tensile elasticity moduli, at least one first fiber bundle being disposed adjacent at least two second fiber bundles, at least one second fiber bundle being disposed adjacent at least two first fiber bundles, wherein the first tensile elasticity moduli is different from the second tensile elasticity moduli.

35 Claims, 4 Drawing Sheets

CONSTRUCTION COMPONENT OR CONSTRUCTION WITH A COMPOSITE STRUCTURE, ASSOCIATED COMPOSITE CONSTRUCTION ELEMENT, AND METHOD OF PRODUCTION

BACKGROUND OF THE INVENTION

1. Field of the Invention

Construction Component or Construction with a Composite Structure, Associated Composite Construction Element, and Manufacturing Method The invention relates to a construction component or construction which at least exhibits at least one composite structure with several bearing fibers arranged essentially parallel to each other, and a binder component, in which the bearing fibers are embedded, the fibers being connected to one another so as to be shear-resistant. A corresponding composite construction element and a manufacturing method also pertain to the subject matter of the invention.

2. Description of Background and Relevant Information

Composite structures of the named type are often used in different areas of technology, especially, for example, in the repair or the subsequent reinforcement of construction components or constructions which originally were produced without an additional composite construction element, especially in those with a reinforced-concrete foundation. In this context, a setting or adaptation of the elasticity characteristics and the solidity values is often desired or essential, especially in consideration of the characteristics of constructions and connection elements working in conjunction with the composite construction element. The fibers considered for this, especially glass and carbon fibers, and, if appropriate, boron fibers or fibers of high-strength polymer synthetic materials, by way of example, are available in a large range of various modulus values, but generally only with large gaps in the value range and in combination with other material parameters, especially tensile fracture resistance. In practice, this results in a severe limitation of selection and adaptation opportunities.

A related problem area concerns the distribution of stress under load in a construction component or construction with different composite structures, especially in a bond between a concrete foundation that, for its part, contains steel reinforcement and therewith its own composite structure, and a fibrous composite construction component connected to this foundation via material-to-material bonding or a form fit. In this respect, too, there is a practical need for advancement.

SUMMARY OF THE INVENTION

The task of the invention is therefore first to create a construction method for construction components, constructions, or composite construction components, and an embodiment of a manufacturing method, of which a setting and an adaptation of the elasticity and solidity characteristics can be facilitated and improved, especially with respect to an extensive and uniform utilization of the bearing fibers.

The solution to this task in accordance with the invention is determined with respect to a construction component or construction or composite construction component by the features of described herein. Regarding the manufacturing method, the solution to the task in accordance with the invention is determined by the features also described herein. Essential refinements and embodiments of the invention are determined by the features which are also described herein.

The features of the invention as defined herein, whether alone or in combination, enable a largely gap-free setting range for the elasticity and solidity characteristics, and for the tension distribution in the construction component or the construction or in the composite construction component. Moreover, the invention helps pave the way toward an optimization of utilization, and of the bearing and deformation behavior of construction components, constructions, or composite construction elements. In particular, moreover, the deformation behavior in stress states near breaking point can be influenced and improved in a controlled and targeted manner.

The features of the invention enable a largely gap-free setting range for the adaptation between the elasticity characteristics of the composite-relevant sections of the foundation, on the one hand, and on the other, of the composite construction component. This is expressed in an overall elasticity modulus to be defined for both sides, that is, in a mean value which, for the foundation, results in accordance with conventional analytical procedures from the respective foundation cross-section, and for the composite construction component, from the sum of the elasticity moduli of the different fiber components, weighted with their fiber cross-section portion. The noted cross-section portions are thereby parameters that can be constantly selected, in terms of construction or manufacturing, with known methods. In order to attain a sufficiently essentially homogenous, or not excessively inhomogeneous, overall cross-section composition, the fibers of the fiber components in the cross-section of the composite structure are to be mutually interspersed, at least in sections. For the same reason, and with respect to the avoidance of a prohibitively low or non-uniform utilization of cross-section portions, the component/cross-section portion ratio is to be limited against certain extreme values. In one embodiment, this delimitation is expressed in the limiting values of the cross-section portion of the fiber components having respectively more or the most tensile strength. In the process of optimizing homogeneity or cross-section utilization, in a refining variant of the invention, minimum values of 18%, and preferably 25%, result in a further development of the invention for the cross-section portions of the fiber component having respectively more or the most tensile strength.

In defining the term "cross-section portion," it is noted that this term is to be understood in the present context as a proportional variable referring to an overall cross-section surface.

Generally, this proportional variable can relate to both an overall fiber cross-section surface of several or all fiber components and an overall cross-section surface of the composite construction element, or a surface within the same. Also figured into the latter definition of the overall cross-section surface are partial surfaces that are irrelevant or can be disregarded with respect to the tensile elasticity of the composite construction element, e.g., the partial surface which is associated with the binder component and which in any case is not decisive for the fiber components. The first definition, however, only involves dimensional variables of the fiber components themselves.

After the overall elasticity modulus as described above results in $E0=A1 \cdot E1 + A2 \cdot E2$ for the example of two fiber components FK1, FK2 with the cross-section portions A1, A2 and the moduli E1 and E2, in the first case, E0 is a characteristic elasticity value for the combination of the fiber components deformed together; in the second case, by contrast, E0 is a characteristic elasticity value for the composite construction component with its respective overall cross-section structure. In both cases, fundamentally-different numerical values result for E0: In the second case, a lower numerical value generally results. This is to be taken into consideration for the use of E0 for evaluating-type calculations, such as for determining deformation under stress. In the first case—insofar as no other components relevant to elasticity are present—only the actual cross-section surfaces of the fiber components are taken into account; in the second case, the cross-section surface of the composite construction component as dictated by constructive guidelines is considered. The latter actually can be desired in practice, but can result in unwieldy characteristics, e.g., when cross-section portions which are irrelevant in terms of elasticity technology, and thus the overall cross-section surface, vary with constant fiber-component cross-sections along the composite construction element.

A refinement fundamental to the invention provides a composite construction element which is connected by way of material-to-material bonding, and thereby in shear-resistant fashion, e.g., by adhesion, to a foundation, whereby the foundation exhibits a tensile-stress-transmitting reinforcement, especially a steel reinforcement, which is embedded in concrete as a matrix so as to transmit the shearing stress. In accordance with the invention, the resulting overall elasticity modulus E0 of the fiber components is then set corresponding to the tensile elasticity modulus of the reinforcement, or at a value that differs from this modulus within preset limits. In the event of a normal stress load of the overall arrangement, this advantageously enables the involvement of the reinforcement and the composite construction element in the bearing function. Now, if—as can be attained with available fibrous materials—the combination of the fiber components exhibits a higher tensile-stress strength than the steel reinforcement, then an over-stressing of the steel reinforcement of the foundation in which the flow point is exceeded does not yet result in the failure of the entire arrangement, but in an excessive stress in the composite construction element that is nevertheless permissible up to a specific, higher stress limit. Before the failure, the overstressing manifests itself as increased deformation, which can be monitored with detection means known per se.

To optimize this variant of the invention, it can be provided that the maximum deviation of the overall elasticity modulus of the fiber components from the reinforcement elasticity modulus is 20%, especially 10%, of the latter.

The invention provides different optimization options for different settings of the elasticity of the fiber components, and the arrangement or distribution and formation of fibers. Thus, with respect to deformation characteristics or bearing capacity, depending on the particulars of the application, it can be advantageous if the fiber components of the composite construction element exhibit various individual-fiber cross-section surfaces, and/or various mean values of these cross-section surfaces. In this regard, and with respect to the manufacturing technique, it is often advantageous for at least two fiber components of the composite construction element to respectively exhibit a number of fiber bundles, whereby the fiber bundles of the two fiber components are interspersed in the overall fiber cross-section. Mostly, it will be practical to arrange the fibers or the fiber bundles of the different fiber components of the composite construction element over the entire fiber cross-section, or a part of the same, with at least approximately uniform distribution.

The composite construction element belonging to the subject matter of the invention is mostly advantageous in a construction component or construction in accordance with the invention, but is, however, generally also applicable in another context. Thereby, a composite construction element is at issue, which exhibits at least one fiber component with several bearing fibers arranged essentially parallel to each other, and at least one binder component, in which the bearing fibers are embedded, the fibers being connected to one another so as to be shear-resistant. At least two fiber components are provided thereby, with reference to which the maximum difference between the proportional values of the elasticity moduli, on one hand, and the stresses at failure, on the other hand, is 0.25, but preferably 0.15. In composite structures of the present sort, the ratio of the tensile stresses being established in the fiber components to uniform tensile deformation—due to the shear-resistant bond—essentially corresponds to the ratio of the elasticity moduli of these fiber components. Consequently, with the features of the above-noted invention variant, the essentially different stresses at failure or the permissible tensions—determined as coinciding fractions of the same—in the affected fiber components are attained with increasing stress, essentially simultaneously or only with preset deviations. This means an optimal utilization of the bearing capacity of the different fiber components.

A further variant of the invention which likewise includes a composite construction element of the above-mentioned sort, and is especially applicable with the last-noted invention features, but can also be used independently of them, provides at least one fiber component which exhibits fibers of a material whose composition and/or makeup is or are different with respect to those of another fiber component. Independently or in combination with the selection of the cross-section portions, this offers an advantageous expansion of the options for different setting of the parameters of the different fiber components, not only regarding the elasticity characteristics, but also regarding the attainable bond strength. For example, glass fibers of different composition or different surface roughness, but whose adhesive characteristics correspond to those of the binder component, can be used in this context. Furthermore, interesting setting possibilities can be anticipated from a combination of fibers of materials of different composition and/or makeup in one and the same fiber component. The same applies for another, essential variant of the invention, namely the formation of fiber components from fibrous materials, namely carbon, glass, and/or polymer substances, that vary from component to component, and even within one and the same component. For the term "fiber component," it should be noted that, in the present context, a component consisting of fibers—if appropriate, those of different types in a local collection—of a more comprehensive fiber arrangement is meant, but not a material component of individual fibers, for example.

The inventive features which have been generally explained above enable the creation of a broad spectrum of characteristic-value pairs of elasticity modulus and tensile strength of bearing-fiber types, of which comparatively few are available. However, it is not to be assumed in general that the different fibrous materials present in the cross-section of the composite construction component are utilized to a defined, preset degree, particularly are equally well-used, with respect to their solidity, or that preset distances between the specified stress tensions and stress at failure are maintained. In accordance with the invention, this can be assisted by prestressing of the fibers arranged in the shear-resistant bond, whereby at least one portion of the bearing fibers and/or the matrix or parts of the same is or are subjected to tensile stress. A consequence of the necessary internal force equalization is that another portion of the bearing fibers, and/or the matrix or parts of the same, is or are also under compressive prestress prior to stress. In the sense of optimization, a number of fiber components with different bearing-fiber tensile-strength values can be provided in accordance with the invention, and the prestressing of these fiber components can be dimensioned to correspond to preset fractional values of the appurtenant tensile-strength values. Thereby, such a prestressing arrangement can, in accordance with the invention, also bring considerable progress, even possibly independently of a construction of the composite structure with different fiber components, i.e., in the event of similar kinds of fibers.

Generally, such a targeted fiber prestressing and a corresponding, preset tension distribution in the stress state can be realized within the composite structure of a larger construction component or construction. In many cases, however, a fibrous composite construction component or fibrous composite construction element that is already independent of the connection to another construction component or construction provided with internal fiber prestressing can aid particularly in progress. The compressive force necessary for this, which works in opposition to the tensile prestressing of the fibers, is assumed by the matrix or by a fiber part which is bound in it and bolstered against buckling. In accordance with the invention, bearing fibers can absorb such compressive tensions over large lengths, even in narrow, rodlike or lamellar composite construction elements, without the danger of buckling or cambering, as a result of rigid and particularly shear-resistant integration into a matrix which, for its part, has a high elasticity modulus. Such an internally-prestressed composite construction element or composite construction component can generally also be connected, without external prestressing, to a construction or other construction component which is in an unstressed or reduced-stress state, if necessary one under only its own stress, whereby the preset overall tension distribution results under stresses that are also to be preset. On the other hand, it can also be appropriate, depending upon the application, to connect the internally-prestressed composite construction component still under additional external to the construction or other construction component. It is also to be noted that, in simple cases, even the connection of a composite construction element that is not internally prestressed to a construction or other construction component under external prestress can be sufficient.

The invention includes a construction component or construction which exhibits at least partially a composite structure with several bearing fibers arranged essentially parallel to each other, and a binder component, in which the bearing fibers are embedded, the fibers being connected to one another so as to be shear-resistant, characterized by the following features: the composite structure comprises at least two fiber components (FK1, FK2) working in conjunction and determining the overall tensile strength of this composite structure, the components having different tensile elasticity moduli (E1, E2); the fibers (F1, F2) of both fiber components (FK1, FK2) are at least arranged over a part of the cross-section of the composite structure in alternating distribution, especially mutually interspersed; and the portion (A1) of the fiber component (FK1) with more tensile strength at the overall fiber cross-section surface of the composite structure amounts to at least 12% and at most 93%.

The invention also provides for a construction component or construction which exhibits at least partially a composite structure with several bearing fibers arranged essentially parallel to each other, and a binder component, in which the bearing fibers are embedded, the fibers being connected to one another so as to be shear-resistant, characterized in that the composite structure is designed as a composite construction element (VBE) connected, via material-to-material bonding and/or positive lockup—especially a shearing-stress-transmitting bond—with a foundation, especially a concrete foundation, of the construction component or construction. The invention may utilize a materia-to-material bonding and/or positive lockup, in an unstressed or reduced-stress state, if necessary under its own stress, to at least one fibrous composite construction element under preset prestressing. The construction component or construction, may be characterized in that the composite construction element (VBE) is designed to extend longitudinally and/or be level. The construction component or construction, may be characterized by the following features: the composite construction element is connected, via material-to-material bonding, to a foundation (GK), which exhibits at least one tensile-stress-transmitting reinforcement (AR), especially one provided with steel elements, which is embedded in concrete as a matrix; the resulting overall elasticity modulus ($E_0$) of the fiber components (FK1, FK2) is at least approximately dimensioned in accordance with the tensile elasticity modulus of the reinforcement (AR).

The invention may include a construction component or construction, characterized in that the maximum deviation of the overall elasticity modulus (E0) of the fiber components from the tensile elasticity modulus of the reinforcement (AR) is 20%, in particular 10%, of the latter. A portion (A1) of at least 18% of the fiber component (FK1) may have more tensile strength is present at the overall fiber cross-sectional surface of the composite structure. A portion (A1) in the range of 25% and 65% of the fiber component (FK1) exhibiting more tensile strength may be present at the overall fiber cross-section surface of the composite structure. The composite construction element may exhibit various individual fiber cross-section surfaces, and/or various mean values of these cross-section surfaces. At least two fiber components of the composite construction element each may exhibit a number of fiber bundles, and in that the fiber bundles of both fiber components are interspersed in the overall fiber cross-section. The fibers or fiber bundles of the different fiber components of the composite construction element may be arranged with at least approximately uniform distribution over at least one part of the overall fiber cross-section.

The invention also provides for a composite construction element with at least one composite structure, which exhibits at least one fiber component with a number of bearing fibers arranged essentially parallel to each other, and a binder component, in which the bearing fibers are embedded, the fibers being connected to one another so as to be shear-resistant, characterized in that at least two fiber components are provided for the composite structure, with a maximum difference of 0.25 with respect to the proportional values of their elasticity moduli, on the one hand, and their stresses at failure on the other. At least two fiber components may be provided for the composite structure, with a maximum difference of 0.15 with respect to the proportional values of their elasticity moduli, on the one hand, and their stresses at failure on the other.

The invention may also include a composite construction element with at least one composite structure, which exhibits at least one fiber component with a number of bearing fibers arranged essentially parallel to each other, and at least one binder component, in which the bearing fibers are embedded, the fibers being connected to one another so as to be shear-resistant, characterized in that at least one fiber component of the composite structure exhibits fibers of a material whose composition and/or makeup is or are different from those of another fiber component.

The invention includes a composite construction element with at least one composite structure, which exhibits at least one fiber component with a number of bearing fibers arranged essentially parallel to each other, and at least one binder component, in which the bearing fibers are embedded, the fibers being connected to one another so as to be shear-resistant, characterized by at least one fiber component that comprises a combination of fibers of materials having a different composition and/or makeup.

There is also provided a composite construction element, especially designed as a tensile-stress-transmitting, lamellar or rod bearer, with several bearing fibers (F1, F2) and with at least one matrix acting as a binder component (BK), in which the bearing fibers are embedded, the fibers being connected so as to be shear-resistant, characterized in that at least one portion of the bearing fibers (F1, F2) is arranged inside the shear-resistant bond of the composite construction element (VBE), with prestressing, in the unstressed state of the composite construction element. A number of fiber components (FK1, FK2) may be provided in the bearing cross-section of at least one section of the composite construction element (VBE), the components being arranged in the shear-resistant bond, with various prestressing, in the unstressed state of the composite construction element (VBE). A number of fiber components (FK1, FK2) may be provided in the bearing cross-section of at least one section of the composite construction element (VBE), the fiber components exhibiting different values for the tensile elasticity modulus (E) and/or tensile strength ($\sigma_S$) and being arranged in the shear-resistant bond, with respectively different prestressing, in the unstressed state of the construction composite element (VBE). A number of fiber components (FK1, FK2) with different bearing-fiber tensile-strength values may be provided, and in that the prestresses of these fiber components are dimensioned corresponding to preset fractional values of the appurtenant tensile-strength values. The composite structure may exhibit a combination of carbon, glass, boron, and/or polymer fibers. The element may especially be designed as a tensile-stress-transmitting, lamellar or rod bearer, with a number of bearing fibers and with at least one matrix acting as a binder component, in which the bearing fibers in the shear composite are embedded, the fibers being bonded so as to be shear-resistant, whereby in the bearing cross-section of at least one section of the composite construction element (VBE), a number of fiber components (FK1, FK2) is provided, which exhibit fibrous materials having different elasticity and/or tensile-strength characteristic values; characterized in that, in the shear-resistant bond, at least one super-elastic fiber component (FK1) is provided, especially having carbon, glass, boron, and/or polymer fibers, and at least one fiber component (FK2), especially a metallic fiber component with a distinctive plastic range and subsequent transformation stabilization, and a residual plastic fracture deformation of at least 1%, is provided.

The invention further provides for a composite construction element, especially designed as a tensile-stress-transmitting, lamellar or rod bearer, with a number of bearing fibers (F1, F2) and with at least one matrix acting as a binder component (BK), in which the bearing fibers are embedded, the fibers being connected so as to be shear-resistant, characterized by at least one super-elastic fiber component (FK1), in particular an arrangement of carbon, glass, boron, and/or polymer fibers, and characterized by at least one transmission element (UE), which is arranged in the force transfer to the bearing fibers (F1) and which yields at a preset limit stress prior to failure of the composite construction element (VBE), and by at least one limiting stop (AS) working in conjunction with the transmission element. The composite construction element may especially be designed as a tensile-stress-transmitting, lamellar or rod bearer, with a number of bearing fibers and with at least one matrix acting as a binder component, in which the bearing fibers are embedded, the fibers being connected so as to be shear-resistant, especially a composite construction element, characterized in that, in at least one force-introduction area, at least one portion of the bearing fibers is connected in a contacting or non-positive manner to each other, and/or to at least one heat-insensitive, especially metallic or ceramic, connecting element (AE). At least one wedge-shaped or conical clamping device may be provided for the non-positive connection between the bearing fibers and the transfer element.

The invention also provides for a process for manufacturing a composite construction element, especially a tensile-stress-transmitting, lamellar or rod bearer, with a number of bearing fibers (F1, F2) and with at least one matrix acting as a binder component (BK), in which the bearing fibers in the shear composite are embedded, the fibers being connected so as to be shear-resistant, in particular for manufacturing a composite construction element, having the following steps: beginning at a supply station, a number of bearing fibers or bearing-fiber bundles is drawn through a passageway to a take-up station in a distribution corresponding to the cross-section and reinforcement formation of the composite construction element to be manufactured; in the supply station, at least one portion of the exiting bearing fibers or bearing fiber bundles is impinged upon by a preset retention force, and thus produces a corresponding fiber prestress; within the passageway, binding agents are worked into the bearing fiber arrangement, and the cross-section shape of the composite construction element is formed, with the bearing fiber arrangement being sheathed; and within the passageway, the unfinished construction element formed in this manner is subjected to a hardening of the binding agent into a fixed matrix, in which the bearing fibers are embedded with a material-to-material, shear-resistant bond, with the fiber prestress being maintained. The process, may be characterized in that, in the supply station, at least two bearing-fiber arrangements or bearing fiber-components are each put under assigned prestress through the impingement by separate retention forces.

The invention also provides for a process for manufacturing a construction component or construction which exhibits a foundation (GK), in particular a concrete foundation, and at least one composite construction element (VBE), which is bonded to the foundation by material-to-material bonding or a form fit, especially a tensile- and/or shearing-stress-transmitting bond, particularly a composite construction element, characterized in that the bond between the composite construction element and the foundation is produced with a stress or deformation of the construction component or a part of the same that is set lower than a preset, maximum overall stress or overall deformation. The process may be characterized in that the bond between the composite construction element and the foundation is produced with a stress or deformation of the construction component or construction or a part of the same that is set lower with respect to a preset, maximum overall stress or overall deformation of at least about 40%, in particular about 75%. The bond between composite construction element and foundation may be produced at least approximately under merely the load of the construction component or construction itself, or a part of the same. The bond between the composite construction element and the foundation may be at least partially produced through adhesion with a quick-curing, high-strength polymer adhesive, particularly such as one on an acrylate base.

BRIEF DESCRIPTION OF THE DRAWINGS

The invention is explained in detail using the schematic depictions in the illustrations. Shown are.

DETAILED DESCRIPTION OF THE INVENTION

Figure 1:
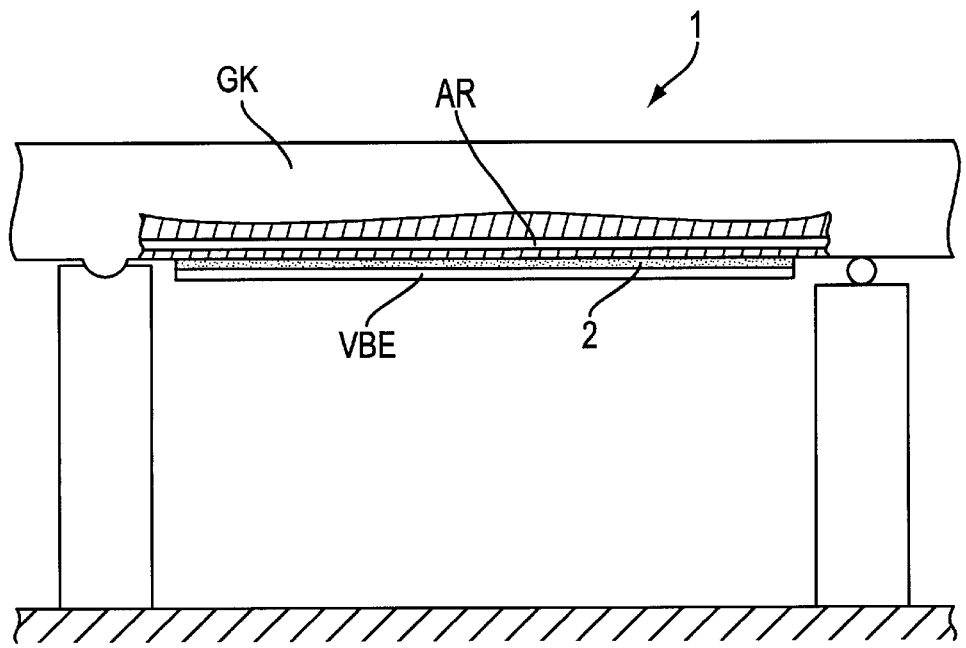
FIG. 1 a section of a reinforced-concrete construction in accordance with the invention with a composite construction element, in side-view, and FIG. 2 a cross-section area of the composite construction element in FIG. 1 with a bordering area of a construction foundation, on a much larger scale as compared to FIG. 1, FIG. 3 the load-expansion diagram of a first embodiment of a composite construction element in accordance with the invention, with reinforcement only of super-elastic bearing fibers, FIG. 4 a diagram as the one in FIG. 3, but for a composite construction element in accordance with the invention with combined reinforcement of super-elastic bearing fibers and bearing fibers with plastic fracture deformation, FIG. 5 a mounting segment of a composite construction element in accordance with the invention, with a non-positive, heat-insensitive load introduction and with a fracture-warning load transfer.

In FIG. 1, a passage carrier 1, which is positioned on vertical supports in a statically-determined manner, and has a concrete foundation GK, is shown as an example in accordance with the invention for a construction component inside a similar construction. As indicated in a partial section, in the region of its underside, the carrier 1 contains only a steel reinforcement AR, illustrated with a rod, of the typical sort. The passage carrier, not depicted in more detail, is designed for taking up a bending stress, so that the reinforcement rod at the carrier underside is located in the tensile-stress area of the carrier.

To reinforce this tension area, a composite construction element VBE, which extends in the carrier longitudinal direction and is otherwise level, is mounted to the carrier underside by means of an adhesive layer 2 of a known type in a connection with the foundation GK that transfers shearing stress. Thus, the reinforcement AR and composite construction element VBE together form the tensile-stress part of the carrier 1.

Figure 2:
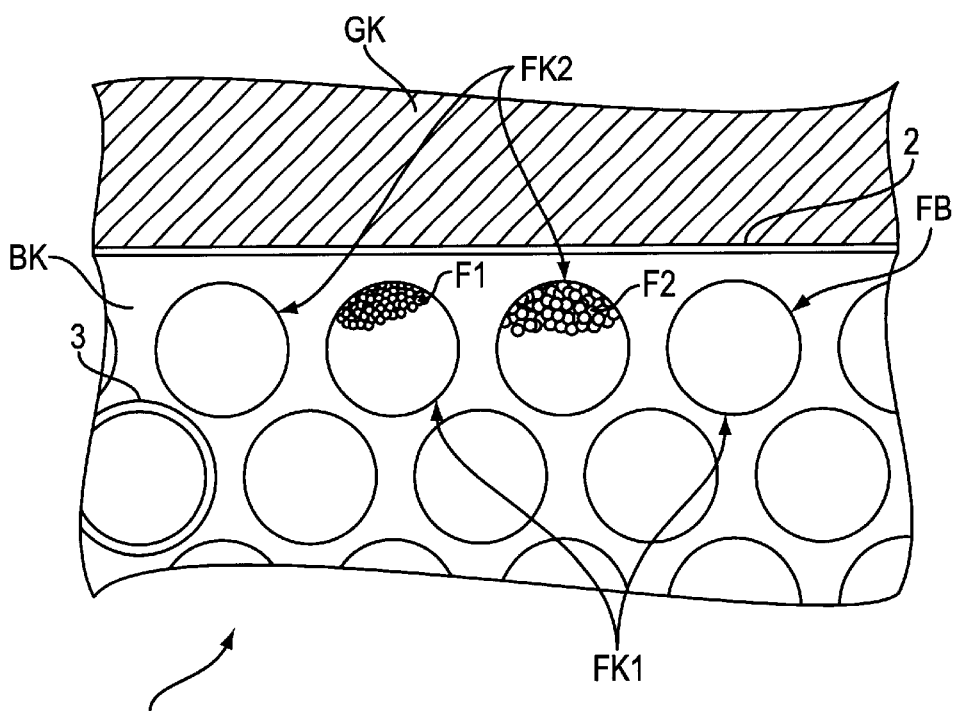

As highlighted in FIG. 2, the composite construction element VBE comprises several fiber bundles FB running parallel to the longitudinal direction of the carrier 1; the fiber bundles FB, for their part, each comprise several individual bearing fibers F1 or F2, which are packed closely together. The fiber bundles can also, if necessary, be fitted with a sheath 3 for the purpose of dense packing of the fibers F1, F2. The fibers of the individual bundles are usefully assembled in a shear-resistant manner by a binder.

The fiber bundles FB are embedded in a binder component BK, e.g., an epoxy resin, and are likewise connected to each other through material-to-material bonding so as to transfer the shearing stress. The adhesive layer 2 and the concrete mass of the foundation GK produce a shearing-stress-transferring bond with the reinforcement AR. As illustrated in detail above, between the reinforcement AR and the bearing-fiber arrangement of the composite construction element VBE, an adaptation of their elasticity moduli occurs. For this, the fiber bundles FB form two fiber components FK1 and FK2 with different fiber elasticity moduli E1, E2. The selected cross-section portions of the components FK1 and FK2 are attained in the example by differing thicknesses of the fibers F1 and F2 with the same diameter of the fiber bundles, so that, correspondingly, different fiber packing densities result inside the bundles, and thus different or definitively-preset overall fiber cross-sections result per bundle. Hereby and, if necessary, additionally, the desired cross-section parts can be established by means of different bundle numbers per fiber component. The fiber bundles are arranged individually in alternation in the example, resulting in a comparatively low inhomogeneity of the entire cross-section construction.

Assisted by the fiber combination and the fiber distribution in the cross-section of the composite construction element, as illustrated in the example, a broad spectrum of characteristic-value pairs of elasticity modulus and tensile strength can be created from types of bearing fibers of which comparatively few are available. However, then it cannot be generally assumed that the different fibrous materials which are present in the cross-section of the composite construction element are utilized even approximately equally well with respect to their solidity, i.e., that respectively preset distances between the noted stress tensions and the failure at stress are maintained.

That can, however, be aided in accordance with the invention by prestressing of the fibers arranged in the shear-resistant bond. A consequence of the necessary internal force equalization is that another portion of the bearing fibers, and/or the matrix or parts of the same, is or are under compressive prestress. Experience has shown that bearing fibers can assume such compressive tensions without the risk of buckling or cambering, and in fact over great distances, even in narrow, rod-shaped or lamellar composite construction elements, due to rigid and especially shear-resistant integration into a matrix that, for its part, has a high elasticity modulus. The prestress, and in fact already in the simplest case, a prestress that encompasses more or less the overall fiber cross-section, has significant advantages, even with regard to the homogenous quality of the fibrous material, e.g., by avoiding a change in operational sign with fluctuating stress (no tension zero passages). Prestress distributions in the overall fiber cross-section, targeted in an irregularly-shaped manner, enable optimization of the tension distribution in the cross-section under load, e.g., with respect to heightened bending-moment absorption. Moreover, such an irregular cross-section distribution of the internal prestress can be used to bring to its failure limit a small cross-section portion, at the rated load or another, suitable, preset stress, through prestressing. The appearing fracture of this small fiber component then leads to an erratic deformation, e.g., a heightened deflection, of an overall composite construction element, and thereby to a desired advance indication of the danger of impending overall failure.

Figure 3:
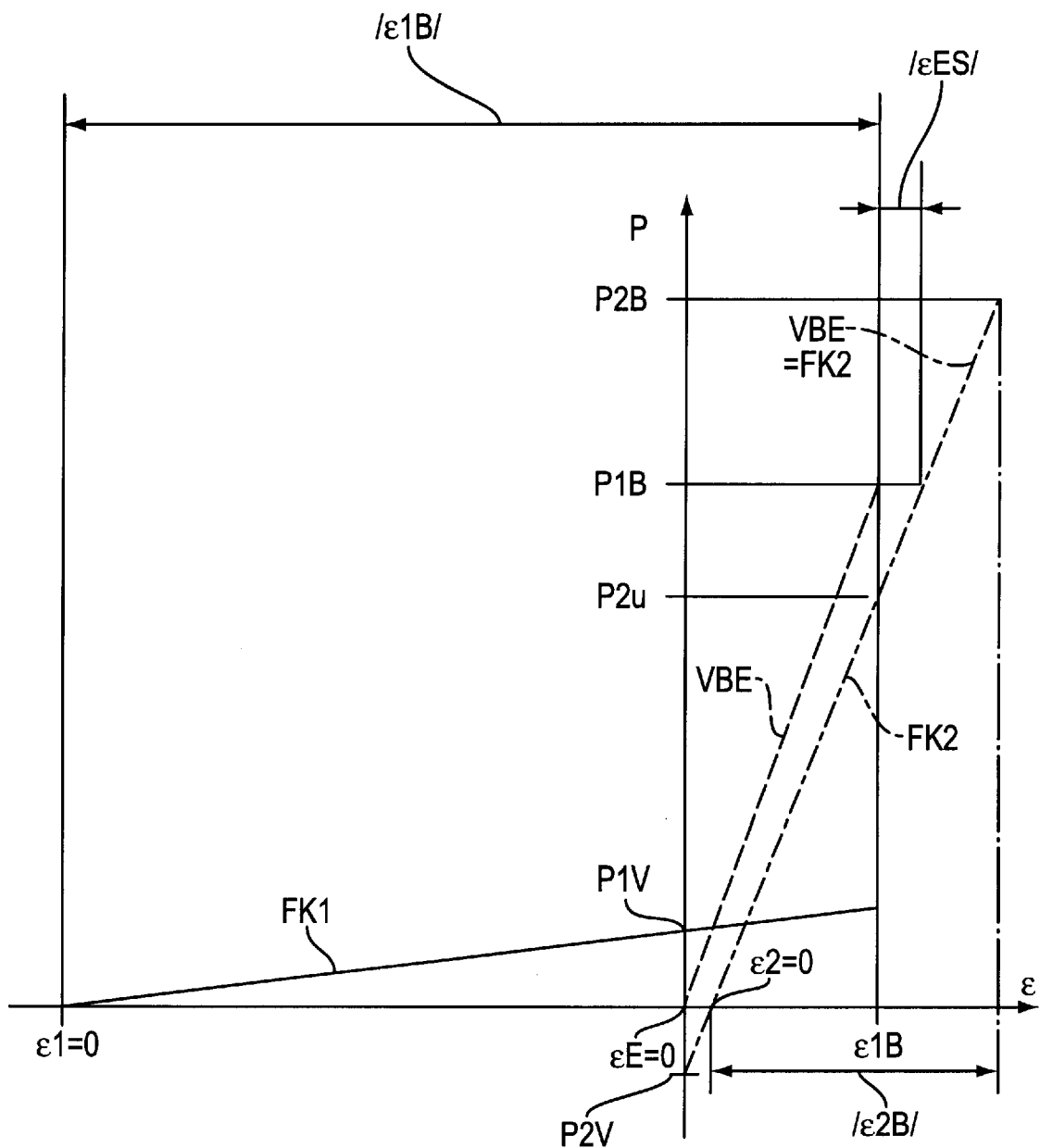

FIG. 3 depicts a special example, in which a number of fiber components with different bearing-fiber tensile-strength values are provided, and the prestresses of these fiber components are dimensioned according to preset fractional values of the appurtenant tensile-strength values. Two fiber components FK1, FK2 with different elasticity and fracture-deformation characteristic values are provided in the bearing cross-section of at least one section of the composite construction element. In the diagram in accordance with FIG. 3, the characteristic values ensue from the characteristic curves, indicated by FK1 or FK2, of the deformation force or prestress and stress force P above the deformation $\in$ relating to the tensionless distance. The deformation of FK1 is referred to with $\in$1, and $\in$2 refers to that of FK2, while $\in$E refers to that of the composite construction element. At the zero point of the deformation of the composite construction element, i.e., $\in$E=0, the tensile prestress force P1V of FK1 is equal and opposed to the compressive prestress force P2V of FK2. The stress characteristic curve of VBE increases, starting from $\in$E=0, until the fracture deformation $\in$1B of FK1 attains its breaking load P1B. The overall amount /$\in$1B/ of the fracture deformation of FK1 is shown at the upper edge of the diagram, starting from the zero deformation $\in$1=0.

Since FK1 is assumed to be the expansively-softer component, with a higher fracture expansion and under much higher prestress expansion, but, as a result of correspondingly-low portion of the overall fiber cross-section, absorbs only a small part of the overall load, the overall load absorption of the composite construction element decreases unsteadily only relatively little, namely to P2u, with the attainment of $\in$1B, only to increase again at once to P1B—postponed only by an inertia mechanism—now, however at the only part of the characteristic curve VBE=FK2 that is still effective, and with a corresponding deformation increase /$\in$ES/, which pre-signals the approach of the overall failure. The latter is then attained with the overall amount /$\in$2B/ of the fracture deformation of FK2 and the fracture load P2B.

Overall, a partially-plastic fracture behavior is realized with this fiber prestress combination, but with the appearance an impact, which is often to be deemed disadvantageous under certain circumstances, occurs when the super-elastic signaling component FK1 fractures.

Figure 4:
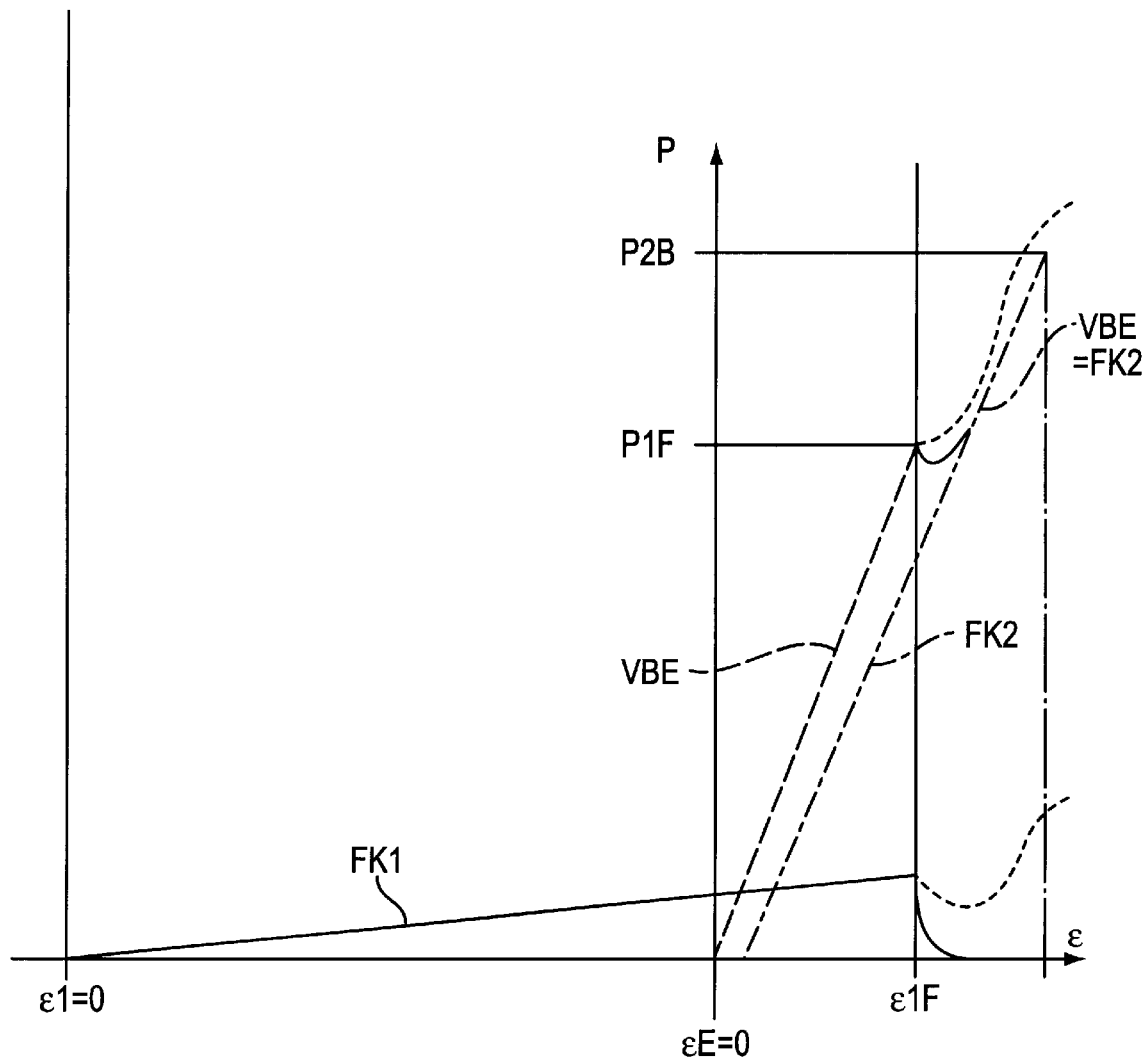

In the example in accordance with FIG. 4—a load-deformation diagram as in FIG. 3—at least one super-elastic fiber component FK1 is provided, especially containing carbon, glass, and/or polymer fibers, and at least one fiber component FK2 with a relevant residual plastic fracture deformation of, for example, at least 1%, is also provided. For FK2, if necessary, a metallic fiber component with a distinctive plastic range and even, if needed, with subsequent transformation stabilization (steel characteristic curve) can be selected to considerable advantage. The prestressing and deformation mechanism is the same as in FIG. 3, which is why another illustration is not provided.

A distinctive plastic deformation threshold value $\in$1F under the load P1F being reached before the fracture load value of FK1 is essential, and this in contrast to the characteristic curve FK1 as in FIG. 3. Indicated at the intersection with $\in$1F, for example as the dashed line in FIG. 4., is a relatively sharp tension decrease with a subsequent "creeping" expansion break, which nevertheless effects a decided "calming", i.e., an essential dampening of the impact in the transition from the characteristic curve VBE to the characteristic curve VBE=FK2. As depicted with the lines comprising smaller dashes to the right of $\in$1F, even a distinctively "steel-like" plastic and fracture behavior can be achieved for FK2 via a corresponding material selection.

Figure 5:
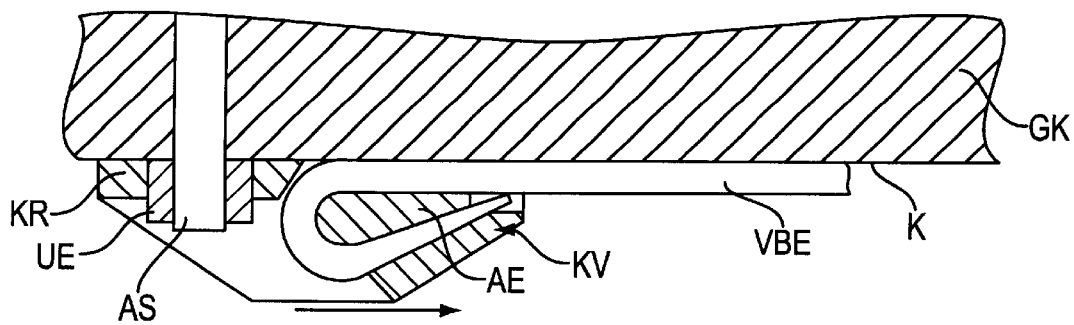

In the embodiment in accordance with FIG. 5, a composite construction element VBE is again anchored in a shear-resistant manner by an adhesion K to the underside of a construction foundation GK. Provided here is also a composite construction element with at least one super-elastic fiber component, especially an arrangement of carbon, glass, and/or polymer fibers. To avoid a fracture which is not warned of by any apparent deformation, at least one transmitting element UE is provided, for example of plastically deformable metal with a distinctive flow point, the element being arranged in the force transmission to the bearing fibers and giving way in a preset failure limit load prior to failure of the composite construction element VBE. This transmitting element is designed in the example as a sheath, and is seated on an anchoring and stop pin AS, which in turn is anchored with heat-resistant mortars or the like in the foundation. The force flux to the composite construction element further ensues through a grommet-like, self-locking clamping device KV with a wedge-shaped connecting element AE. In this way, not only is a signaling give of the bond attained with the overstressing of the composite construction element by radial plastic deformation of the transmitting element UE and subsequently, again, a rigid form-fit force transmission through contact between the collar KR of the clamping device KV and the anchoring and stop pin AS, but also an emergency securing against collapse and failure of the matrix of the composite construction element by, for example, heat effect, e.g., as a result of a fire in or on the construction.

Figure 6:
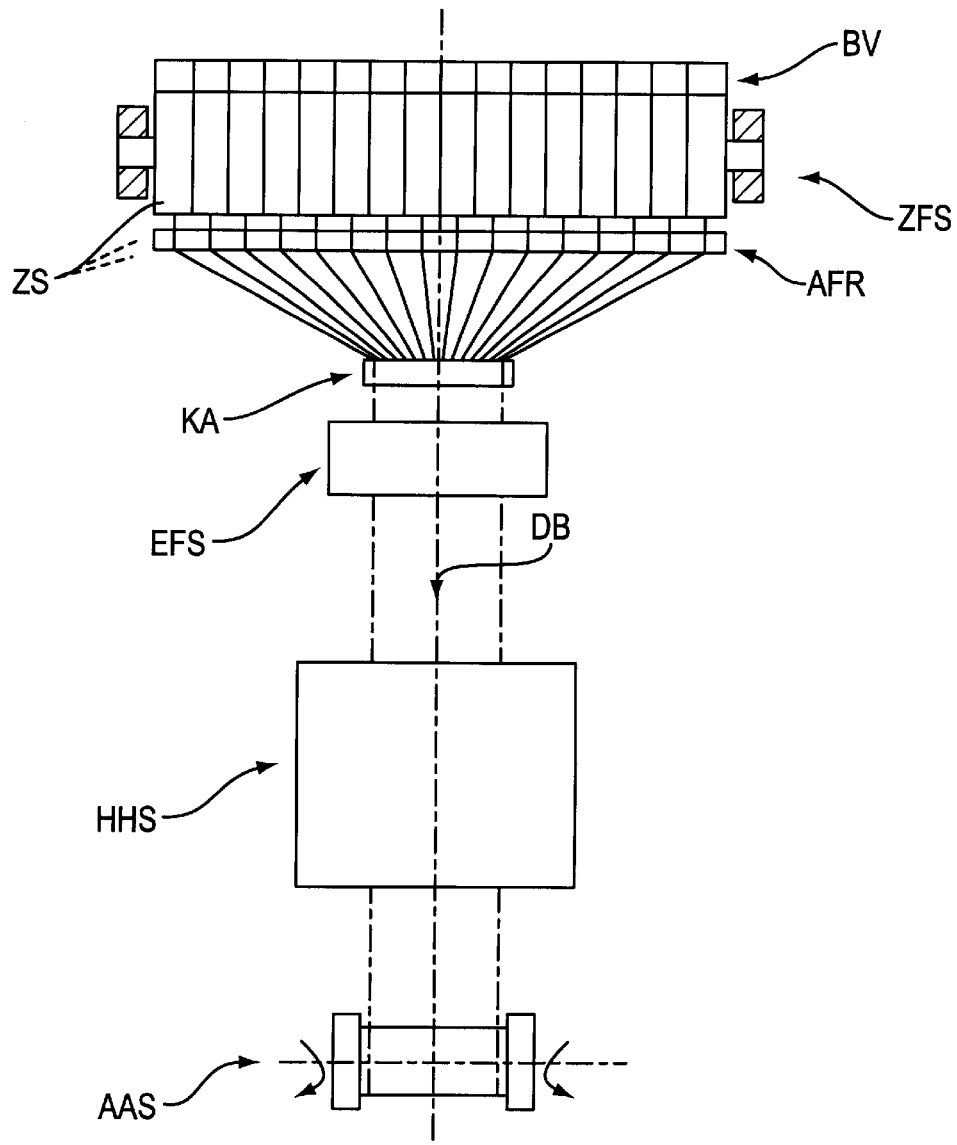
FIG. 6 a block diagram of a passage-creation facility for producing composite construction elements in accordance with the invention.

The facility delineated in FIG. 6 in the block diagram for executing an example of the manufacturing process in accordance with the invention, with constant material passage along a passage path DB, works as follows:

Several bearing fibers or bearing-fiber bundles are made available in a supply station ZFS on a battery of supply spools ZS arranged, for example, coaxially or staggered. Each of these spools is fitted with an individually-settable braking device BV. The fiber bundles reach a comb or hole arrangement KA via an exit guide AFR, where they are arranged with a two-dimensional cross-section distribution corresponding to the form [shape] of the desired fiber reinforcement. The profile of the rope-shaped unfinished composite is shape in a subsequent embedding and shaping station EFS, which, for example, exhibits an extruder that takes up reinforcing fibers in the passage and is loaded with the binding material for the matrix. The composite then enters a heating and hardening station HHS, into the exit area of which a machining and fabrication station also can be integrated, for example for shaping grinding of the hardened unfinished composites. In the final station, AAS the discharge and intake station, the composite construction elements, which are succeeding each other in individual pieces or which are also continually entering as continuous goods, insofar as they are level and are designed to be sufficiently bendable, are continuously wrapped together with the fiber reinforcement. Hereby the production of sufficient tensile forces on the overall fiber reinforcement present in the passage is significant. This enables the maintenance of the set prestresses up to the embedding and hardening of the matrix in a shear-resistant bond with the fiber reinforcement, in connection with the already-noted individual retardation of the reinforcement fibers or fiber bundles or fiber groups.

Generally, in this way, even composite construction elements with more complex cross-section and profile shapes can be manufactured, e.g., even multiple-angle profiles and hollow profiles.

In particular, for purposes of the subsequent reinforcement and repair of constructions through the addition or installation of fibrous composite construction elements, which mostly have a lamellar, longitudinally-extending design, working with or without comparatively low prestressing of the composite construction element is desired, whereby even in the event of prestress mounting, no high demands are made with respect to a defined prestress setting. Nonetheless, the production of the bond between the composite construction element and the foundation of the construction—above all, in highly-frequented transportation structures—often ensues under an operating load. In regard to the stress-dependent deformation of the construction, this has the consequence of an undesired limitation of the load transfer by the composite construction element. A process in accordance with the invention therefore provides that the bond between composite construction element and foundation is produced with a stress or deformation of the construction component or construction or a part thereof, the stress or deformation being set lower with respect to a preset, maximum overall stress or overall deformation, preferably with regard to a preset, maximum overall stress or overall deformation by at least about 40%, particularly at least about 75%, advantageously even solely under the stress of the construction itself. This is facilitated and, in many cases, enabled at all, in accordance with a refinement of the invention in that the bond between the composite construction element and the foundation is at least partially produced through adhesion with a quick-curing, high-strength polymer adhesive, particularly such as one on an acrylate base.

What is claimed is:

1. A composite reinforcing structure for reinforcing a structural member comprising:
   a plurality of first fiber components arranged substantially parallel to one another and surrounded by a binder matrix, at least two of the plurality of first fiber components comprising first fiber bundles;
   a plurality of second fiber components arranged substantially parallel to one another and surrounded by the binder matrix, at least two of the plurality of second fiber components comprising second fiber bundles;
   each of the first fiber bundles comprising a plurality of individual bearing fibers arranged substantially parallel to one another, the plurality of individual bearing fibers comprising a first tensile elasticity moduli;
   each of the second fiber bundles comprising a plurality of individual bearing fibers arranged substantially parallel to one another, the plurality of individual bearing fibers comprising a second tensile elasticity moduli;
   at least one first fiber bundle being disposed adjacent at least two second fiber bundles;
   at least one second fiber bundle being disposed adjacent at least two first fiber bundles;
   wherein the first tensile elasticity moduli is different from the second tensile elasticity moduli.

2. The composite reinforcing structure of claim 1, wherein at least one of the plurality of the first or the second fiber components are under a predetermined tensile bias stress.

3. The composite reinforcing structure of claim 1, wherein at least one of the plurality of the first fiber components and at least one of the plurality of second fiber components is under a predetermined tensile bias stress.

4. The composite reinforcing structure of claim 1, wherein at least one of the first fiber bundles and at least one of the second fiber bundles comprises a plurality of individual bearing fibers which are arranged in an approximately uniform distribution.

5. The composite reinforcing structure of claim 1, wherein the individual bearing fibers of the first fiber bundles comprises a material which is different from a material of the individual bearing fibers of the second fiber bundles.

6. The composite reinforcing structure of claim 1, wherein each of the plurality of first fiber components comprises a first diameter.

7. The composite reinforcing structure of claim 1, wherein each of the plurality of second fiber components comprises a second diameter.

8. The composite reinforcing structure of claim 1, wherein each of the plurality of first fiber components comprises a first tensile strength.

9. The composite reinforcing structure of claim 1, wherein each of the plurality of second fiber components comprises a second tensile strength.

10. The composite reinforcing structure of claim 1, wherein at least some of the individual bearing fibers comprise at least one of carbon fibers, glass fibers, boron fibers, and polymer fibers.

11. The composite reinforcing structure of claim 1, wherein at least some of the individual bearing fibers are embedded in a binder and connected to each other in a shear-resistant manner.

12. The composite reinforcing structure of claim 1, wherein the binder matrix which surrounds the first and second fiber components also surrounds the individual bearing fibers of the fiber bundles.

13. The composite reinforcing structure of claim 1, wherein the plurality of first fiber components and the plurality of second fiber components are arranged to be uniformly dispersed in the binder matrix.

14. The composite reinforcing structure of claim 13, wherein the plurality of first fiber components and the plurality of second fiber components cooperate to produce a composite sheet having a predetermined overall elasticity modulus and tensile strength.

15. The composite reinforcing structure of claim 1, wherein one of the plurality of first fiber components and the plurality of second fiber components comprise a tensile elasticity moduli value and a stress failure value, the tensile elasticity moduli value being within 0.25 of the stress failure value.

16. The composite reinforcing structure of claim 15, wherein one of the plurality of first fiber components and the plurality of second fiber components comprise a tensile elasticity moduli value and a stress failure value, the tensile elasticity moduli value being within 0.15 of the stress failure value.

17. The composite reinforcing structure of claim 1, wherein at least one of the plurality of the first fiber components and at least one of the plurality of the second fiber components is a super-elastic fiber component, the super-elastic fiber component comprising one of carbon fibers, glass fibers, boron fibers, and polymer fibers.

18. The composite reinforcing structure of claim 17, wherein each of the plurality of first fiber components is a super-elastic fiber component.

19. The composite reinforcing structure of claim 18, wherein at least one of the plurality of second fiber components comprises metallic fibers.

20. The composite reinforcing structure of claim 19, wherein the metallic fibers comprise a residual plastic deformation of at least 1%.

21. The composite reinforcing structure of claim 1, further comprising a surface for connecting to the structural member, the surface being adapted to connect the composite reinforcing structure to the structural member in a shear-resistant manner.

22. The composite reinforcing structure of claim 21, wherein the composite reinforcing structure is adapted to be connected to the structural member by one of a material-to-material bond and positive lockup.

23. The composite reinforcing structure of claim 21, wherein the structural member comprises a concrete body.

24. The composite reinforcing structure of claim 23, wherein the concrete body comprises at least one tensile-stress-transmitting reinforcement which is embedded in the concrete body.

25. The composite reinforcing structure of claim 24, wherein the tensile-stress-transmitting reinforcement comprises an overall tensile elasticity moduli which is approximately equal to or greater than an overall tensile elasticity moduli of the composite reinforcing structure.

26. The composite reinforcing structure of claim 25, wherein the overall tensile elasticity moduli of the composite reinforcing structure is within 20% of the overall tensile elasticity moduli of the tensile-stress-transmitting reinforcement.

27. The composite reinforcing structure of claim 26, wherein the overall tensile elasticity moduli of the composite reinforcing structure is within 10% of the overall tensile elasticity moduli of the tensile-stress-transmitting reinforcement.

28. A composite reinforcing structure for reinforcing a structural member comprising:
a plurality of first fiber components arranged substantially parallel to one another and surrounded by a binder matrix, each of the plurality of first fiber components comprising first fiber bundles;
a plurality of second fiber components arranged substantially parallel to one another and surrounded by the binder matrix, each of the plurality of second fiber components comprising second fiber bundles;
each of the first fiber bundles comprising a plurality of individual bearing fibers arranged substantially parallel to one another, the plurality of individual bearing fibers comprising a first tensile elasticity moduli;
each of the second fiber bundles comprising a plurality of individual bearing fibers arranged substantially parallel to one another, the plurality of individual bearing fibers comprising a second tensile elasticity moduli;
at least one first fiber bundle being disposed between at least two second fiber bundles;
at least one second fiber bundle being disposed between at least two first fiber bundles;
wherein the first tensile elasticity moduli is diffenent from the second tensile elasticity moduli.

29. A method of reinforcing a structural member using a composite reinforcing structure which comprises a plurality of first fiber components arranged substantially parallel to one another and surrounded by a binder matrix, at least two of the plurality of first fiber components comprising first fiber bundles, a plurality of second fiber components arranged substantially parallel to one another and surrounded by the binder matrix, at least two of the plurality of second fiber components comprising second fiber bundles, each of the first fiber bundles comprising a plurality of individual bearing fibers arranged substantially parallel to one another, the plurality of individual bearing fibers comprising a first tensile elasticity moduli, each of the second fiber bundles comprising a plurality of individual bearing fibers arranged substantially parallel to one another, the plurality of individual bearing fibers comprising a second tensile elasticity moduli, at least one first fiber bundle being disposed adjacent at least two second fiber bundles, at least one second fiber bundle being disposed adjacent at least two first fiber bundles, wherein the first tensile elasticity moduli is different from the second tensile elasticity moduli, the method comprising:
attaching a surface of the composite reinforcing structure to a surface of the structural member,
wherein the composite reinforcing structure reinforces the structural member.

30. The method of claim 29, wherein the attaching comprises at least one of bonding and connecting using at least one stop element.

31. The method of claim 29, wherein the attaching comprises utilizing at least one stop element for cooperating with a force transmission element which is arranged so as to limit a yielding movement of the composite reinforcing structure with respect to the structural member.

32. A method of manufacturing a composite reinforcing structure which comprises a plurality of first fiber components arranged substantially parallel to one another and surrounded by a binder matrix, at least two of the plurality of first fiber components comprising first fiber bundles, a plurality of second fiber components arranged substantially parallel to one another and surrounded by the binder matrix, at least two of the plurality of second fiber components comprising second fiber bundles, each of the first fiber bundles comprising a plurality of individual bearing fibers arranged substantially parallel to one another, the plurality of individual bearing fibers comprising a first tensile elasticity moduli, each of the second fiber bundles comprising a plurality of individual bearing fibers arranged substantially parallel to one another, the plurality of individual bearing fibers comprising a second tensile elasticity moduli, at least one first fiber bundle being disposed adjacent at least two second fiber bundles, at least one second fiber bundle being disposed adjacent at least two first fiber bundles, wherein the first tensile elasticity moduli is different from the second tensile elasticity moduli, the method comprising:
arranging the plurality of first and second fiber components in a parallel manner;
introducing a tensile stress into at least some of the fiber bundles;
embedding the plurality of first and second fiber components in the matrix binder; and
allowing the matrix binder to harden.

33. The method of claim 32, further comprising sheathing at least some of the plurality of first and second fiber components prior to embedding.

34. The method of claim 32, further comprising embedding at least some of the fiber bundles in a binder so as to form at least one of a first and second fiber component.

35. The method of claim 32, further comprising embedding at least some of the individual bearing fibers in a binder so as to form at least one fiber bundle.

* * * * *